May 16, 1933.  F. W. DOUTHITT  1,909,666
GANG CORN CUTTING MACHINE
Filed Aug. 9, 1928  2 Sheets-Sheet 1
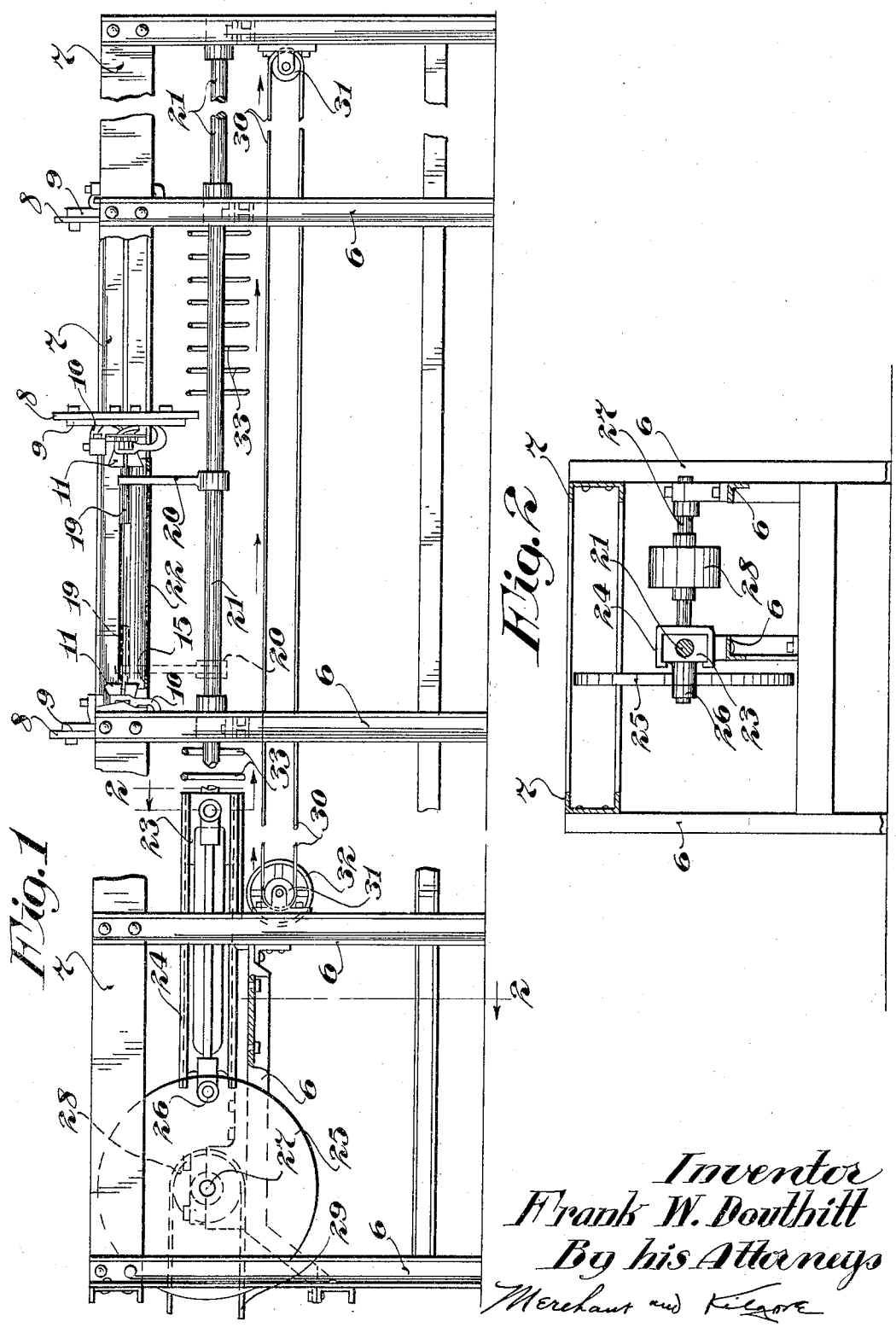
Inventor
Frank W. Douthitt
By his Attorneys
Merchant and Kilgore May 16, 1933.　　　F. W. DOUTHITT　　　1,909,666
GANG CORN CUTTING MACHINE
Filed Aug. 9, 1928　　　2 Sheets-Sheet 2
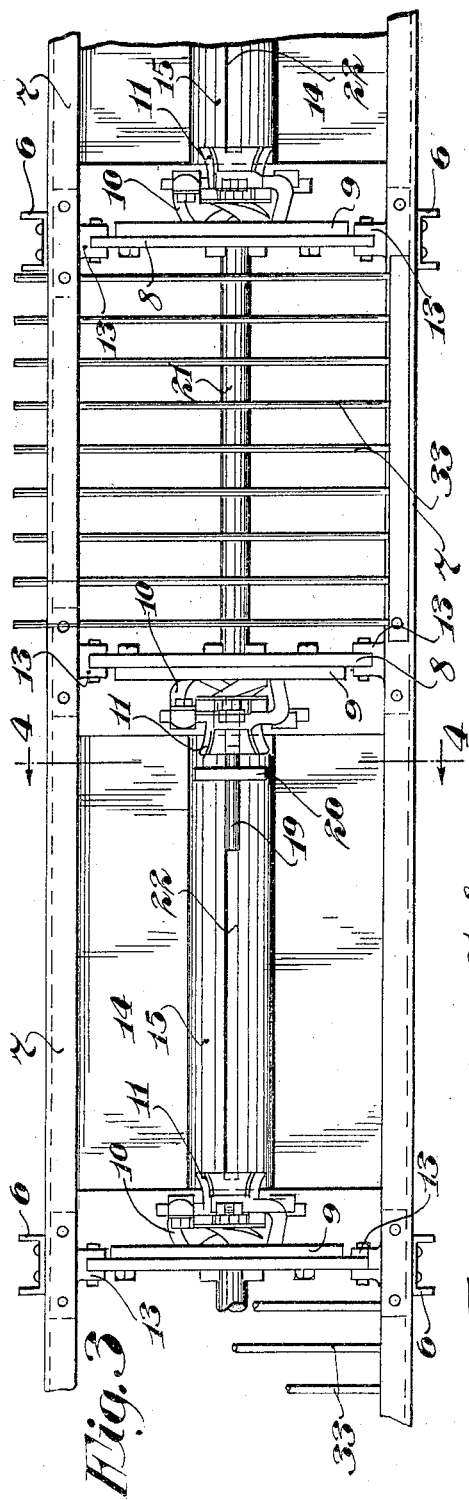
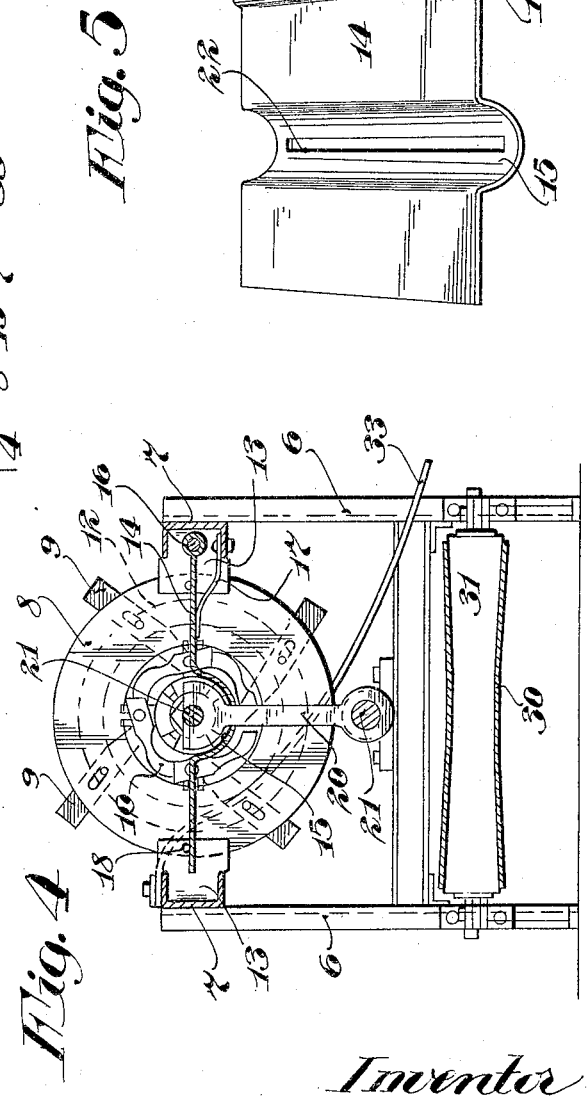
Inventor
Frank W. Douthitt
By his Attorneys Patented May 16, 1933

1,909,666

UNITED STATES PATENT OFFICE

FRANK W. DOUTHITT, OF ORTONVILLE, MINNESOTA

GANG CORN CUTTING MACHINE

Application filed August 9, 1928. Serial No. 298,565.

My present invention relates to a simple and highly efficient corn cutting machine for use in cutting the kernels of corn from the cobs for canning or otherwise preserving the same, and has for its object the provision of a pair of cutter heads and a reciprocating member for alternately feeding ears of corn to the cutter heads as they are successively positioned for the reciprocating member.

In the preferred arrangement of the machine, rotary cutter heads are used and of the type disclosed and broadly claimed in my copending application entitled "Cutter head for corn cutting machines," filed June 27, 1928, under S. N. 288,648. The present invention is especially well adapted for use in a gang corn cutting machine wherein a plurality of units, each comprising a pair of cutter heads and a reciprocating feed member, are employed depending on the capacity of the machine and wherein a common feed mechanism is used for reciprocating the members to feed the ears of corn to the several pairs of cutter heads.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a fragmentary side elevation of a gang corn cutting machine;

Fig. 2 is a transverse vertical section taken on the irregular line 2—2 of Fig. 1;

Fig. 3 is a fragmentary plane view of the principal parts shown in Fig. 1;

Fig. 4 is a transverse vertical section taken on the line 4—4 of Fig. 3; and

Fig. 5 is a perspective view of one of the holders for an ear of corn, removed from the machine.

The gang corn cutting machine illustrated, includes a relatively long rectangular frame having an open top and indicated as an entirety by the numeral 6 with the exception of a pair of longitudinally extended laterally spaced top channel bars 7 mounted in the open top of the frame 6. Between the bars 7 is a plurality of rotary cutter heads arranged in pairs. These cutter heads are fully described in detail in the heretofore identified application and for the purpose of this case, it is only necessary to note that each cutter head includes an annular head plate 8 to which a plurality of levers 9 are intermediately pivoted and which levers have on their inner ends cutter blades 10 and a sectional annular depth gauge 11.

The cutter blades 10 and the sections of the depth gauge 11 for each cutter head are held by the levers 9 circumferentially spaced about the axis of the head plate 8, with an axial passage therethrough for an ear of corn. For causing simultaneous expansion and contraction of the cutter blades 10 and the sections of the depth gauge 11, the levers 9 are connected to a shaft ring 12 turnably mounted on the head plate 8. This shaft ring 12 is normally and yieldingly held by a spring, not shown, with the cutter blades 10 and sections of the depth gauge 11 contracted to their smallest diameters. Ears of corn are fed endwise of the cutter head and upon entering the depth gauge expand the same, which in turn operate the levers 9 and expand the cutter heads 10 to a diameter to cut the kernels of corn from the cob passing through the cutter head.

The head plates 8 extend transversely of the frame 6 between the bars 7 and are rigidly secured thereto by brackets 13 in axially alignment longitudinally of the frame 6. The cutter heads of each pair are axially spaced and reversely positioned with their sectional depth gauges 11 turned toward each other. Between each pair of cutter heads is a holder 14 having a trough-like seat 15, that is substantially semi cylindrical in cross section with its axis substantially aligned with the axes of the cutter heads for holding an ear of corn longitudinally aligned with the cutter heads for endwise feeding movement into either one of their depth gauges 11 and through the axial passages in the cutter heads. It will be understood of course that from certain aspects of the invention, the holder 14 may be otherwise shaped and constructed, the essential feature being the supporting and directing of the ear to the cutting means. This holder 14, as shown, is in the form of a flat plate having one of its longitudinal edges hinged at 16, to certain of the brackets 13 on the front bar 7 for swinging movement in a vertical plane whereby the ear aligning holder 14 is mounted for movement relative to the axis of the cutter heads.

A flat spring 17 anchored to the front bar 7 directly under the hinge 16 yieldingly holds the holder 14 raised and pressed against stop pins 18 in certain of the brackets 13 on the rear bar 7. When the holder 14 is held by the spring 17 against the stop pins 18, the axis of the seat 15 is substantially aligned with the axis of the cutter heads for directing a small sized ear of corn into either of the depth gauges 11. In case a large ear of corn is in the seat 15, the same upon being fed into one of the depth gauges will be automatically centered thereby in respect to the cutter blades 10, and at which time the holder 14 will yield or move downward relative to the axis of the cutter head against the tension of the spring 17 to permit the centering of said ear of corn with the cutter head.

To alternately feed ears of corn to the cutter heads as they are successively placed in the seat 15, there is provided a reciprocating double ended plunger 19 axially aligned with the cutter heads. This plunger 19 is intermediately and rigidly secured to the upper end of an upright arm 20. There is one of these plungers 19 and arms 20 for each unit of the machine or in other words, for each pair of cutter heads, and all of said arms are rigidly secured to a horizontal shaft 21 mounted for endwise sliding movement in bearings on the frame 6. These arms 20 work in longitudinally extended slots 22 formed in the bottoms of the holders 14 with sufficient clearance to permit yielding movements of said holders against the action of the springs 17 as heretofore described.

Various different means may be used for reciprocating the shaft 21 and imparting a like movement to the plungers 19 and which means, as shown, includes a cross head 23 rigidly secured to one end of the shaft 21 and mounted in a guide 24 on the frame 6. This cross head 23 is operated by a wheel 25 eccentrically connected by a pitman 26 to said cross head. The wheel 25 is mounted on a shaft 27 journaled in bearings on the frame 6 and having applied to one end thereof a pulley 28 over which runs a driven belt 29.

The cutter blades 10 are so arranged as to cut the kernels of corn from the cobs with a shearing action as said ears are fed to and through the cutter heads by the reciprocating plungers 19. The kernels of corn as they are cut from the cobs are precipitated onto an endless traveling apron 30 below the cutter heads and mounted on a pair of end pulleys 31 for traveling movement longitudinally of the machine within the frame 6. The pulleys 31 are inwardly tapered from both ends to their longitudinal centers for holding the apron 30 dished as shown in Fig. 4 to assist in holding the kernels of corn thereon. One of the rollers 31 is driven by a pulley 32 on its shaft and over which pulley 32 runs a driven belt not shown.

From the apron 30 the kernels of corn may be delivered to a conveyor of any suitable type and carried any direction to a washing machine for removing the silk, pieces of cob or other foreign matter from the kernels of corn. At the delivery sides of the cutter heads and overlying the apron 30 are downwardly and outwardly inclined deflecting bars 33 which extend transversely of the frame 6 to receive the corn cobs as they are discharged from the cutter heads, separate the same from the kernels of corn and convey said cobs to one side of the machine.

The operation of the gang corn cutting machine may be briefly described as follows:

It may be assumed that the machine is being operated with the plungers 19 reciprocating between the several pairs of cutter heads at the proper speed and that the belt 30 is being driven in the direction of the arrows marked in Fig. 1. There will be an operator for each unit of the machine and a supply of corn within easy reach. Each unit of the machine consists of a pair of cutter heads and a reciprocating plunger.

The operators place the husked ears of corn in the seats 15 while the plungers are feeding ears of corn through one of the cutter heads of the several pairs and at which time said plungers will be at one end of the seat 15. As herein described, the ear aligning holders 14 are mounted for movement relative to the axis of the cutter heads, i. e., the holders are mounted to freely yield as a unit in predetermined directions (upwardly and downwardly) relative to the axis of the cutter heads. In the prior art devices heretofore employed for holding ears of corn during feeding movement into the cutter head, the holder has always consisted of two or more independent parts each of which is mounted for a different movement relative to the axis of the cutter head to clamp the ears centrally with respect to a line drawn vertically through the axis of the cutter head but which construction will not function to automatically axially align ears of varying sizes and shapes with the cutter head during feeding movement. It will thus be seen, by the construction herein disclosed, that as ears of corn are fed along the aligning holders 14 the ears cooperate with the holders and depth gauges 11 to automatically adjust the holders to constantly support the ears longitudinally aligned with the axis of the cutter heads as they are fed to and through the same. At the completion of the feeding of ears of corn through one of the cutter heads of each pair, the plungers 19 are reversed and during their return movement, engage the ears of corn in the seats 15 and move the same endwise through the other cutter heads.

It is evident that the plungers 19 may be operated just as fast as the operators can place the ears of corn in the seats 15 and the knives 10 efficiently cut the kernels of corn from the cobs. The gang machine may contain any desired number of units that can be efficiently operated and one or more of the units may be used depending upon the output desired.

What I claim is:

1. A machine of the class described having a cutter head, a holder mounted for raising and lowering movements relative to the axis of said cutter head, said holder having a centering seat for aligning an ear of corn with the cutter head, yielding means normally holding the holder raised, and a feed device for feeding ears of corn to the cutter head as they are successively positioned in the seat of the holder.

2. A machine of the class described having a cutter head, a holder comprising a horizontally disposed plate hinged at one of its edges parallel to the axis of the cutter head for vertical swinging movement, and having a trough-like centering seat for aligning an ear of corn with the cutter head, yielding means normally holding the holder in a raised position, and a feed device for feeding ears of corn to the cutter head as they are successively positioned in the seat of the holder.

3. In a gang corn cutting machine of the class described, means for supporting ears of corn, a cutter head disposed adjacent opposite ends of said supporting means, said supporting means being mounted for movement relative to the axis of said cutter head, feed means operable to move successive ears in opposite directions in said supporting means and through the respective cutter heads, and adjustment permitting means for axially aligning successive ears of corn with said cutter heads operable by the ears as they are fed along said supporting means.

4. A machine of the class described, a holder for ears of corn, cutter heads arranged adjacent opposite ends of said holder, feed means mounted to reciprocate in said holder between said cutter heads, and means permitting automatic adjustment of said holder during reciprocation of said feed means for axially aligning successive ears with said cutter heads operable by the ear being fed.

5. A machine of the character described comprising, cutting means, a yielding ear aligning holder pivotally mounted for movement as a unit relative to the axis of said cutting means, and a feed device for feeding an ear of corn to said cutting means while the ear is supported by said holder.

6. A machine of the class described having cutting means, an ear aligning holder mounted for movement as a unit relative to the axis of said cutting means, yielding means for supporting said holder, and means for feeding an ear of corn to said cutting means as the ear is supported by the holder.

7. A machine of the class described having cutting means, an ear aligning holder mounted for movement relative to the axis of said cutting means, said holder having means for aligning an ear of corn with the cutting means, yielding means for supporting said holder, and means for feeding an ear of corn to said cutting means as the ear is supported by the holder.

8. A machine of the class described having a pair of spaced cutter heads, an ear aligning holder extending between said cutter heads, yielding means buoyantly supporting said holder for movement relative to the axis of each of said cutter heads, and means for alternately feeding ears of corn to said cutter heads as they are successively positioned on said holder.

9. A machine of the class described having a pair of spaced cutter heads, an ear aligning holder mounted between said cutter heads for movement relative to the axis thereof, and a plunger mounted to work between said cutter heads for alternately feeding ears of corn thereto as they are successively positioned on said holder.

10. A machine of the class described, a holder for ears of corn, cutting means adjacent one end of said holder, said holder being mounted for movement relative to the axis of said cutting means, feed means mounted to reciprocate in said holder to and from said cutting means, and means coacting with said holder permitting automatic adjustment thereof during reciprocation of said feed means for axially aligning an ear with said cutting means operable by the ear being fed.

11. A machine of the class described, a holder for ears of corn, cutting means adjacent opposite ends of said holder, said holder being mounted for movement relative to the axis of said cutting means, feed means mounted to reciprocate in said holder to and from said cutting means, and means permitting automatic adjustment of said holder during reciprocation of said feed means for axially aligning successive ears with said cutting means operable by the ear being fed.

12. A machine of the character described comprising, cutting means, floating means for supporting an ear of corn mounted for movement relative to the axis of said cutting means, said cutting means being disposed adjacent opposite ends of said supporting means, feed means operable to move successive ears in opposite directions in said supporting means and through the respective cutting means, and adjustment permitting means for said supporting means to axially align the ears relative to the respective cutter heads operable by the ear being fed.

13. A machine of the class described including cutting means, a yieldingly supported ear aligning holder pivotally mounted for movement as a unit with respect to the axis of said cutting means, and a feed device for feeding an ear of corn to said cutting means, whereby said ear of corn is adapted to automatically adjust said holder to constantly support the ear in axial alignment with the axis of said cutting means as the ear is fed along the holder.

14. In a corn cutting machine, the combination of cutting means having an axial feed passageway, means for receiving and directing an ear in axial alinement with said passageway, and means for yieldingly supporting said ear alining means to shift in substantially a vertical direction to permit that portion of the ear being operated upon by the cutting means to centralize itself in said cutting means.

15. In a corn cutting machine, the combination of cutting means having an axial feed passageway, means for receiving and directing an ear in axial alinement with said passageway, means for yieldingly supporting said ear alining means to shift in substantially a vertical direction to permit that portion of the ear being operated upon by the cutting means to centralize itself in said cutting means, and a plunger for engaging the ear and moving the same along the receiving and directing means for the ear into and through the passageway in the cutting means.

In testimony whereof I affix my signature.

FRANK W. DOUTHITT.